United States Patent
Burdin et al.

(10) Patent No.: US 8,396,124 B2
(45) Date of Patent: *Mar. 12, 2013

(54) METHOD OF PREDICTING MOTION AND TEXTURE DATA

(75) Inventors: Nicolas Burdin, Paris (FR); Gwenaëlle Marquant, La Chapelle Chaussee (FR); Pierre Dagois, Cesson Sevigne (FR)

(73) Assignee: Thomson Licensing, Issy les Moulineaux (FR)

( * ) Notice: Subject to any disclaimer, the term of this patent is extended or adjusted under 35 U.S.C. 154(b) by 548 days.

This patent is subject to a terminal disclaimer.

(21) Appl. No.: 12/085,984

(22) PCT Filed: Nov. 23, 2006

(86) PCT No.: PCT/EP2006/068782
§ 371 (c)(1),
(2), (4) Date: Sep. 23, 2009

(87) PCT Pub. No.: WO2007/065795
PCT Pub. Date: Jun. 14, 2007

(65) Prior Publication Data
US 2010/0039555 A1   Feb. 18, 2010

(30) Foreign Application Priority Data
Dec. 5, 2005 (FR) .................................. 05 53710

(51) Int. Cl.
*H04N 7/12* (2006.01)
(52) U.S. Cl. ......... 375/240.13; 375/240.25; 375/240.21; 348/452

(58) Field of Classification Search ............. 375/240.16, 375/240.14, 240.21, 240.25, 240.13; 348/448; 382/233, 235, 250, 239, 238, 236
See application file for complete search history.

(56) References Cited

U.S. PATENT DOCUMENTS

| | | | |
|---|---|---|---|
| 5,270,813 A * | 12/1993 | Puri et al. ................. | 375/240.15 |
| 5,742,343 A * | 4/1998 | Haskell et al. ........... | 375/240.15 |
| 6,057,884 A | 5/2000 | Chen | |
| 6,400,768 B1 | 6/2002 | Nagumo et al. | |
| 6,493,391 B1 * | 12/2002 | Komori et al. ........... | 375/240.25 |
| 7,961,785 B2 * | 6/2011 | Marquant et al. ........ | 375/240.12 |
| 7,970,056 B2 * | 6/2011 | Soroushian .............. | 375/240.12 |

(Continued)

FOREIGN PATENT DOCUMENTS

| EP | 0577337 A2 | 1/1994 |
|---|---|---|
| EP | 0644695 A2 | 3/1995 |

(Continued)

OTHER PUBLICATIONS

"Spatial Prediction in Scalable Video Coding," A. Vincent et al., Communications Research Centre, Canada, Sep. 14-18, 1995, pp. 244-249.*

(Continued)

*Primary Examiner* — Victor Kostak
(74) *Attorney, Agent, or Firm* — Robert D. Shedd; Jeffrey M. Navon (57) ABSTRACT

A method for generating for at least one block of pixels of a picture of a sequence of interlaced pictures at least one motion predictor and at least one texture predictor from motion data, respectively texture data, associated with the pictures of a sequence of low resolution progressive pictures is disclosed.

7 Claims, 5 Drawing Sheets

U.S. PATENT DOCUMENTS

| | | | |
|---|---|---|---|
| 8,023,561 B1 * | 9/2011 | Garrido et al. | 375/240.15 |
| 8,155,192 B2 * | 4/2012 | Marquant et al. | 375/240.16 |
| 2002/0041632 A1 * | 4/2002 | Sato et al. | 375/240.25 |
| 2003/0086622 A1 | 5/2003 | Klein Gunnewiek et al. | |
| 2003/0185456 A1 * | 10/2003 | Sato et al. | 382/250 |
| 2004/0013195 A1 | 1/2004 | Panusopone et al. | |
| 2005/0089098 A1 | 4/2005 | Sato et al. | |
| 2005/0129122 A1 | 6/2005 | Booth et al. | |
| 2005/0190844 A1 | 9/2005 | Kadano et al. | |

FOREIGN PATENT DOCUMENTS

| | | |
|---|---|---|
| JP | 06078292 A | 3/1994 |
| JP | 06209468 A | 7/1994 |
| JP | 07162870 A | 6/1995 |
| JP | 1118085 A | 1/1999 |
| JP | 2001045475 A | 2/2001 |
| JP | 2009517941 A | 4/2009 |
| WO | 2005064948 A1 | 7/2005 |
| WO | 2007063017 A1 | 6/2007 |

OTHER PUBLICATIONS

"Hierarchical Coding of Digital Television," Tihao Chiang et al., IEEE Communications Magazine, May 1994, pp. 38-45.*

"Spatial Domain Resolution Scalable Video Coding," A Puri et al., Proceedings of the SPIE, vol. 2094, 1993, pp. 718-729.*

"Extended Spatial Scalability for Non Dyadic Video Formats: from SDTV to HDTV" by Marquant et al, Thomson Video Compression Lab, vol. 5960 No. 1, Jul. 12, 2005, pp. 547-558.*

"MPEG-2/ECVG Lookahead Hybrid Quantization and Spatially Scalable Coding" by Sadik Bayrakeri and Russel M. Mersereau, Center for Signal and Image Processing, vol. 3024, 1997, pp. 129-137.*

J. Reichel, H. Schwarz, M. Wien: "Joint Scalable Video Model JSVM-3 Annex S. (JVT-P202)", Joint Video Team (JVT) of ISO/IEC MPEG & ITU-T VCEG , Jul. 25, 2005, XP002378451, pp. 1-151.

S. Bayrakeri et al.: "MPEG-2/ECVQ Lookahead Hybrid Quantization and Spatially Scalable Coding", Proceedings of the SPIE, vol. 3024, 1997, pp. 129-137.

A Puri et al: "Spatial domain resolution scalable video coding" Proceedings of the SPIE, vol. 2094, 1993, pp. 718-729.

H. Schwarz et al: "Constrained Inter-layer Prediction for Single-Loop Decoding in Spatial Scalability" Image Processing, 2005, IEEE Int'l Conference on Genova, Italy Sep. 11-14, 2005, pp. 870-873 XP010851192.

Gwenaelle Marquant et al: "Extended spatial scalability for non-dyadic video formats: From SDTV to HDTV" Proc Spie Int. Soc. Opt. Eng. Proceedings of SPIE—The Int'l Society for Optical Engineering; vol. 5960, No. 1, Jul. 12, 2005, pp. 547-558, XP002378452. Search Report Dated Mar. 26, 2007.

* cited by examiner

METHOD OF PREDICTING MOTION AND TEXTURE DATA

This application claims the benefit, under 35 U.S.C. §365 of International Application PCT/EP2006/068782, filed Nov. 23, 2006, which was published in accordance with PCT Article 21(2) on Jun. 14, 2007 in English and which claims the benefit of French patent application No. 0553710, filed Dec. 5, 2005.

1. FIELD OF THE INVENTION

The invention relates to a method for generating, for pictures of a high resolution interlaced sequence, at least one motion predictor and, where appropriate, at least one texture predictor from motion data and, where appropriate, texture data associated with pictures of a low resolution progressive sequence.

2. BACKGROUND OF THE INVENTION

Hierarchical encoding methods with spatial scalability are known. Scalability represents the ability to stagger information to make it decodable at multiple resolution and/or quality levels. More specifically, a data stream generated by this type of encoding method is divided into several layers, in particular a basic layer and one or more enhancement layers. These methods are used in particular to adapt a single data stream to variable transport conditions (bandwidth, error ratios, etc.), and to the expectations of the customers and the varying capabilities of their receivers (CPU, specifications of the display device, etc.). In the particular case of spatial scalability, the part of the data stream corresponding to low resolution pictures of the sequence can be decoded independently of the part of the data stream corresponding to the high resolution pictures. On the other hand, the part of the data stream corresponding to high resolution pictures of the sequence can be decoded only from the part of the data stream corresponding to the low resolution pictures.

Hierarchical encoding with spatial scalability makes it possible to encode a first data part called basic layer, relative to the low resolution pictures and, from this basic layer, a second data part called enhancement layer, relative to the high resolution pictures. Normally, each macroblock of the high resolution picture is temporally predicted according to a conventional prediction mode (for example, bidirectional prediction mode, direct mode, forward prediction mode, etc.) or indeed is predicted according to an inter-layer prediction mode. In this latter case, motion data (for example, a partitioning of the macroblock into blocks, possibly including motion vectors and reference picture indices) and, where appropriate, texture data associated with a block of pixels of the high resolution picture, is deduced or inherited from the motion data, or respectively texture data, is associated with blocks of pixels of a low resolution picture. However, the known methods do not allow such predictors to be generated in the case where the low resolution sequence is progressive and the high resolution sequence is interlaced.

3. SUMMARY OF THE INVENTION

The object of the invention is to overcome at least one of the drawbacks of the prior art.

The invention relates to a method for generating for at least one block of pixels of a picture of a sequence of high resolution interlaced pictures, called high resolution sequence, at least one motion predictor from motion data associated with the pictures of a sequence of low resolution progressive pictures, called low resolution sequence. Each interlaced picture comprises a top field interlaced with a bottom field. Each progressive picture and each field of an interlaced picture has associated with it a temporal reference. The method makes it possible in particular to generate:

if the temporal frequency of said high resolution sequence is equal to the temporal frequency of said low resolution sequence, at least one motion predictor for said at least one block of pixels:
  from motion data associated with at least one block of pixels of the low resolution picture with the same temporal reference as the top field of said high resolution picture; and/or
  from motion data associated with at least one block of pixels of the low resolution picture with the same temporal frequency as the bottom field of said high resolution picture;

if the temporal frequency of the high resolution sequence is equal to twice the temporal frequency of said low resolution sequence, at least one motion predictor for said at least one block of pixels from motion data associated with at least one block of pixels of the low resolution picture with the same temporal reference as the top field of said high resolution picture.

Advantageously, if the temporal frequency of the high resolution sequence is equal to the temporal frequency of the low resolution sequence, the at least one motion predictor is generated by subsampling the motion data associated with the at least one block of pixels of the low resolution picture with the same temporal reference as the top field of the high resolution picture by a horizontal inter-layer ratio in the horizontal direction of the picture and a vertical inter-layer ratio in the vertical direction of the picture.

According to another embodiment, if the temporal frequency of the high resolution sequence is equal to the temporal frequency of the low resolution sequence, the at least one motion predictor is generated by subsampling the motion data associated with the at least one block of pixels of the low resolution picture with the same temporal reference as the bottom field of the high resolution picture by a horizontal inter-layer ratio in the horizontal direction of the picture and a vertical inter-layer ratio in the vertical direction of the picture.

According to another embodiment, if the temporal frequency of the high resolution sequence is equal to twice the temporal frequency of the low resolution sequence, the at least one motion predictor is generated for the at least one block of pixels by subsampling the motion data associated with the at least one block of pixels of the low resolution picture with the same temporal reference as the top field of the high resolution picture by a horizontal inter-layer ratio in the horizontal direction of the picture and a vertical inter-layer ratio in the vertical direction of the picture.

The method according to the invention also makes it possible to generate:

if the temporal frequency of the high resolution sequence is equal to the temporal frequency of the low resolution sequence, at least one texture predictor for the at least one block of pixels:
  from texture data associated with the at least one block of pixels of the low resolution picture with the same temporal reference as the top field of the high resolution picture; and/or from texture data associated with the at least one block of pixels of the low resolution picture with the same temporal reference as the bottom field of the high resolution picture; and/or from texture data associated with each of the at least one block of pixels of the low resolution pictures with the same temporal reference as one of the bottom or top fields of the high resolution picture; and if the temporal frequency of the high resolution sequence is equal to twice the temporal frequency of the low resolution sequence, at least one texture predictor for the at least one block of pixels from texture data associated with the at least one block of pixels of the low resolution picture with the same temporal reference as the top field of the high resolution picture.

Preferably, the motion data associated with the low resolution pictures comprises motion vectors.

Advantageously, the method is used by a method of encoding high resolution pictures from low resolution pictures and by a method of decoding high resolution pictures from low resolution pictures.

Preferably, the low resolution pictures are encoded according to the MPEG-4 AVC standard.

4. BRIEF DESCRIPTION OF THE DRAWINGS

The invention will be better understood and illustrated by means of exemplary embodiments and advantageous implementations, by no means limiting, given with reference to the appended figures in which.

5. DETAILED DESCRIPTION OF THE INVENTION

Figure 1:
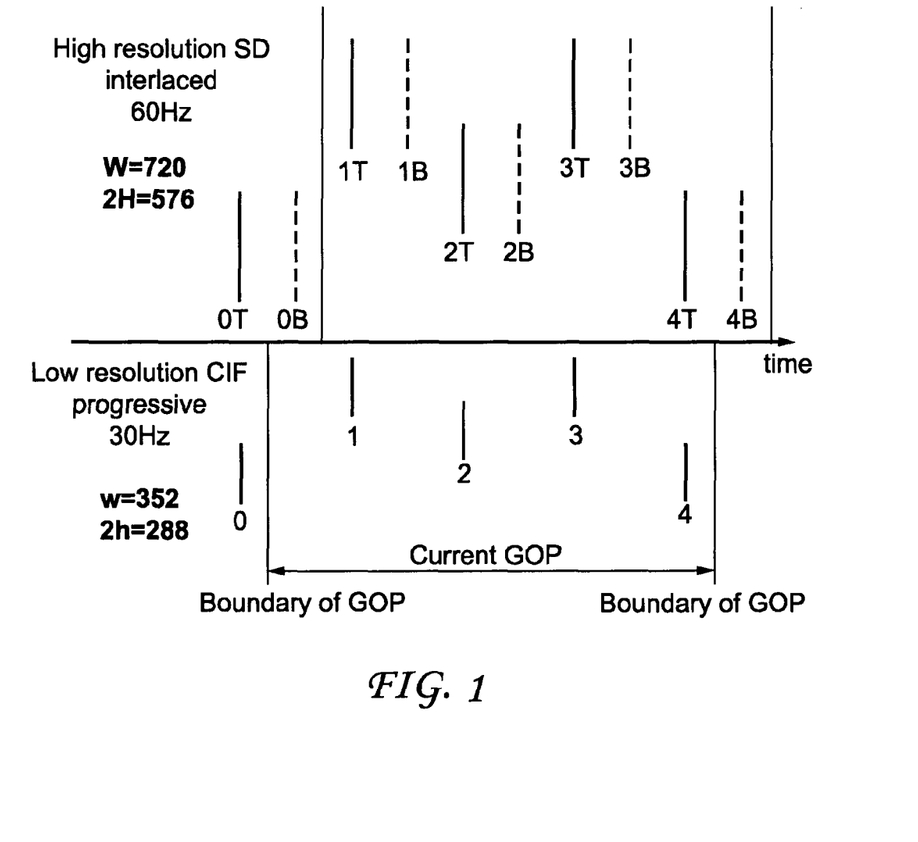
FIG. 1 represents a progressive sequence of low resolution pictures and an interlaced sequence of high resolution pictures with a temporal frequency twice that of the low resolution sequence.
Figure 2:
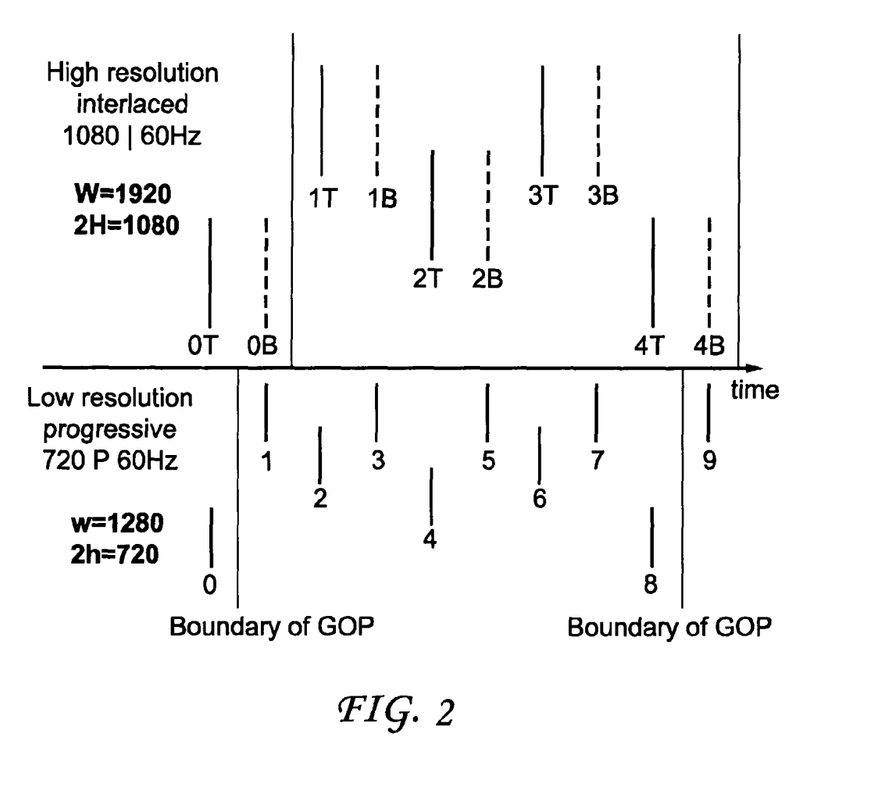
FIG. 2 represents a progressive sequence of low resolution pictures and an interlaced sequence of high resolution pictures with the same temporal frequency as that of the low resolution sequence.

The invention relates to an inter-layer prediction method which consists in generating motion predictors and, where appropriate, texture predictors, for pictures of an ordered sequence of high resolution interlaced pictures, called high resolution sequence, from pictures of an ordered sequence of low resolution progressive pictures, called low resolution sequence. The sequences are divided into groups of pictures (GOP). Each high resolution picture comprises a top field interlaced with a bottom field. In FIGS. 1 and 2, an interlaced picture of index k is made up of a top field referenced kT and a bottom field referenced kB, and a progressive picture is referenced by its index k. A temporal reference is associated with each picture of a progressive sequence and with each field of an interlaced sequence. A field of a high resolution picture, called high resolution field, and a low resolution picture having the same temporal reference, coincide vertically. The low resolution pictures, also referenced LR pictures, have a width w (w representing a number of pixels or columns) and a height of 2h (2h representing a number of pixels or lines and means 2 multiplied by h). The high resolution pictures, also referenced HR pictures, have a width W (W representing a number of pixels or columns) and a height of 2H (2H representing a number of pixels or lines and meaning 2 multiplied by H). Each field of a high resolution picture has a width W and a height H. In the embodiment described, the interlaced pictures can be encoded either in field picture mode, i.e. each field is encoded as a separate picture, or even in frame picture mode, i.e. the two fields are encoded together. The lines of a picture are numbered from 0 and therefore the first line is an even line and the second line (numbered 1) is an odd line.

The invention therefore consists in generating, for pictures of the high resolution sequence or for at least one block of pixels of the latter, at least one motion predictor and, where appropriate, at least one texture predictor. A texture predictor associated with a high resolution picture or with at least one block of pixels of a high resolution picture, is a picture or a prediction block which associates with each of its pixels texture data (for example, a luminance value and, where appropriate, chrominance values), which is generated from texture data associated with at least one picture (or field), or at least one block of pixels of a low resolution picture (or at least one block of pixels of a field) according to a method of subsampling the texture such as the ESS method applied to the texture (ESS standing for Extended Spatial Scalability) which is described in sections S.8.3.6.4 and S.8.5.14.2 of document ISO/IEC MPEG & ITU-T VCEG, entitled "Joint Scalable Video Model JSVM3 Annex-S", referenced JVT-P202, J. Reichel, H. Schwarz, M. Wien. This document is referenced JSVM3 below. A motion predictor associated with a high resolution picture or with at least one block of pixels of a high resolution picture is defined as a prediction picture or a prediction block with which is associated motion data (for example, a type of partitioning, possibly with reference picture indices making it possible to identify the reference pictures to which the motion vectors point). The motion predictor is generated from motion data associated with at least one picture (or field) or at least one block of pixels of a low resolution picture (or at least one block of pixels of a field) according to a motion subsampling method such as the ESS method applied to the motion which is described in section S.8.4.1.6.3 of JSVM3, or such as the modified ESS method, described below, derived from the ESS method applied to the motion. The modified ESS method, referenced MESS in FIG. 3, makes it possible in particular to process high and/or low resolution interlaced sequences. More specifically, it makes it possible to deal with the case where the height or the width of the high resolution picture is less than that of the low resolution picture. This case is illustrated by FIG. 2, where the height H (H=540) of the top or bottom field of a high resolution picture is less than the height 2h (2h=720) of a low resolution frame picture. Furthermore, it makes it possible advantageously to avoid having the motion predictors include invalid motion vectors, i.e. vectors that point to unavailable reference pictures, when the prediction method according to the invention is used by a hierarchical encoding or decoding method. For example, with reference to FIG. 2, the low resolution picture 5 can be referred temporally to the low resolution picture 6, processed earlier. However, the high resolution field 2B cannot be referenced to the high resolution field 3T, which, temporally, is not yet available when the field 2B is processed.

Figure 5:
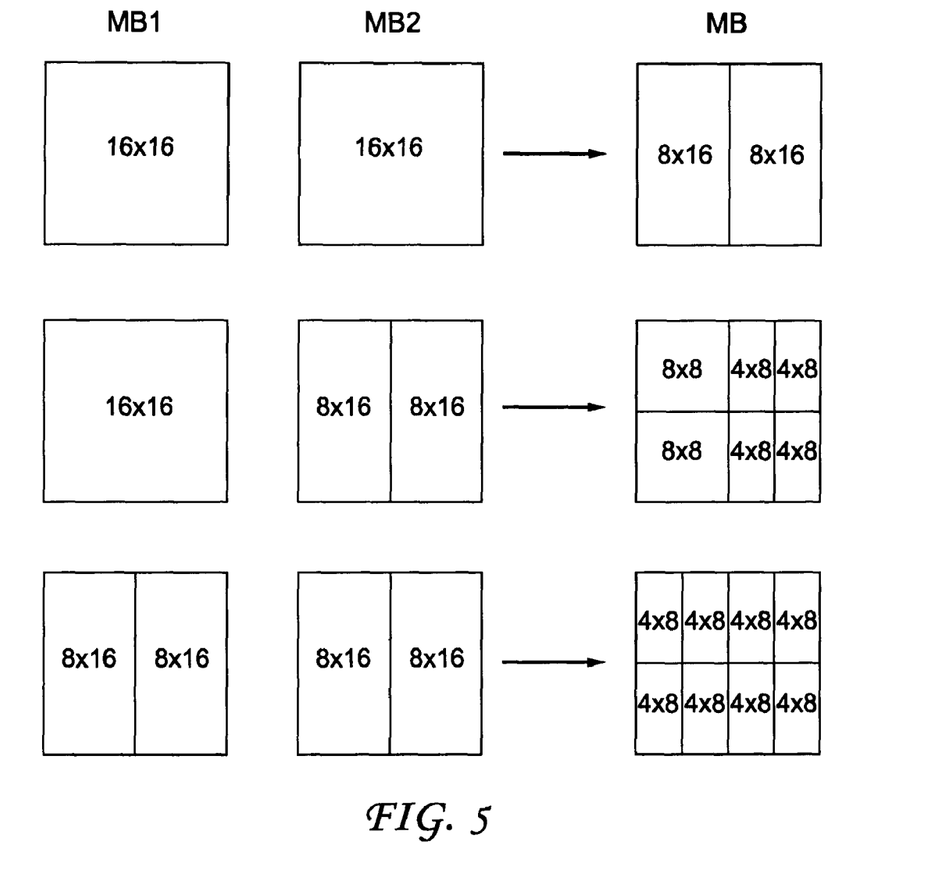
FIG. 5 illustrates the subsampling by a factor of 2 in the horizontal direction of the picture of two macroblocks MB1 and MB2 of a low resolution picture and the resulting partitioning for the corresponding predictor macroblock MBpred.

According to the modified ESS method, an intermediate motion predictor is generated by subsampling by 2 the motion data associated with the low resolution picture, more particularly, the motion data associated with each of the macroblocks of the low resolution picture, in the vertical direction of the picture, in the horizontal direction of the picture, or in both directions. The method of subsampling by 2 is repeated in the vertical direction of the picture as long as the height of said intermediate predictor is greater than the height of the high resolution picture and it is repeated in the horizontal direction of the picture as long as the width of said intermediate predictor is greater than the width of the high resolution picture. The subsampling consists in particular in dividing by two the coordinates of the motion vectors associated with the blocks of pixels. For example, with reference to FIG. 5, based on two macroblocks MB1 or MB2 of the low resolution picture possibly divided into blocks of pixels, a macroblock MB of the intermediate motion predictor is generated. The size of the blocks of pixels in a macroblock is indicated above said macroblock. For example, in the second line of FIG. 5, the macroblock MB1 is not divided, the macroblock MB2 is divided into two blocks measuring 8 by 16 pixels (denoted 8×16) and the macroblock MB generated from these two macroblocks is divided into four 8×8 blocks, two of which are divided into 4×8 blocks. The indices of reference pictures are made uniform between the blocks of 8 by 8 pixel size within a macroblock MB, and isolated intra-type blocks within a macroblock MB are deleted in the same way as in the ESS inter-layer prediction method applied to the motion and described in JSVM3. The motion predictor associated with the high resolution picture is generated from the last intermediate motion predictor generated in this way, by applying the ESS method with an inter-layer ratio equal to $$\frac{W}{w_i}$$

in the horizontal direction of the picture and $$\frac{2H}{2h_i}$$

in the vertical direction of the picture, where $w_i$ and $2h_i$ are respectively the width and the height of the last intermediate motion predictor generated. Furthermore, for each prediction macroblock, the motion vector inheritance method is modified so as not to generate invalid motion vectors, i.e. vectors that point to fields or frame pictures that are not available in the temporal breakdown process. In this case, if all the motion vectors associated with a prediction macroblock MB_pred are invalid then the inter-layer motion prediction is not authorized for this macroblock. Otherwise, i.e. if at least one of the vectors is valid, the ESS prediction method applied to the motion is used.

Figure 3:
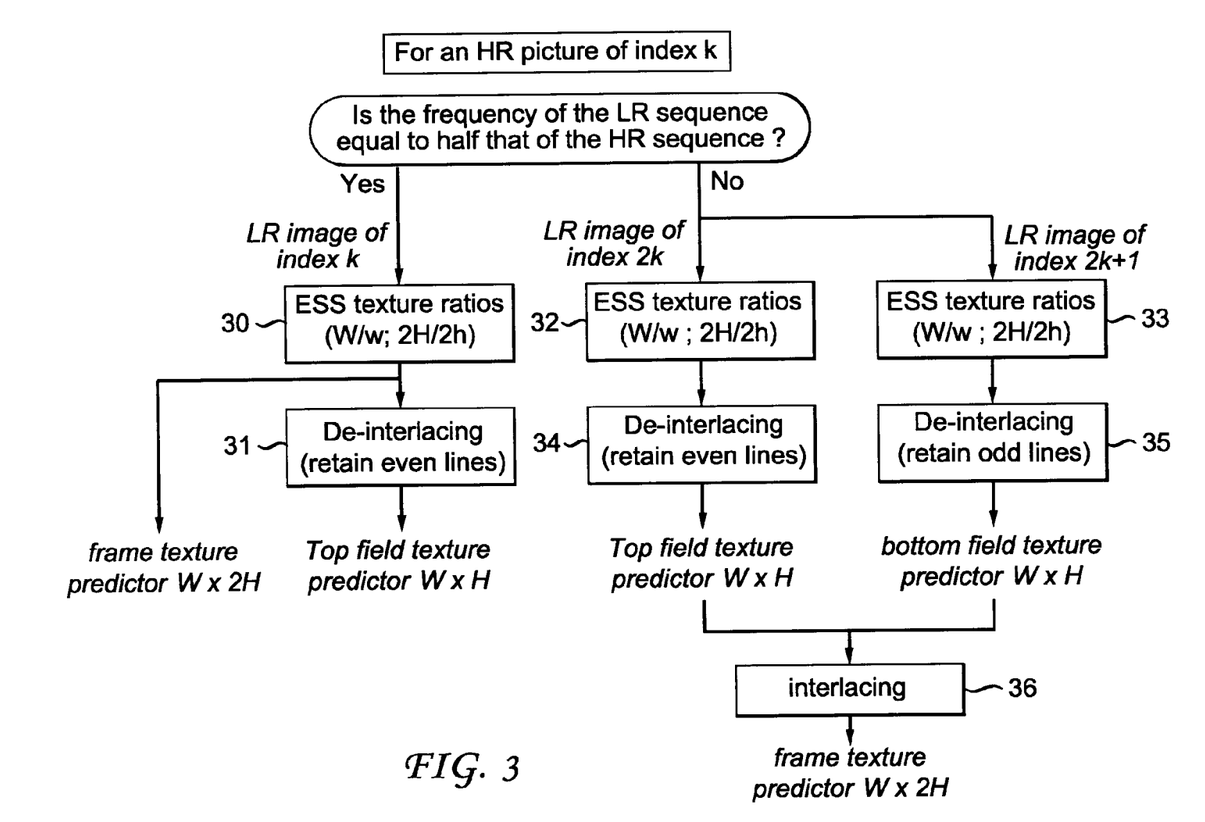
FIG. 3 illustrates the method of generating texture predictors according to the invention in the case where the sequence of low resolution pictures is progressive and the sequence of high resolution pictures is interlaced.

The method according to the invention, illustrated by FIGS. 1 to 4, is described for a picture but can be applied to a part of a picture and in particular to a block of pixels, for example a macroblock. The left-hand part of FIG. 3 illustrates the generation of texture predictors associated with the high resolution pictures of index k in FIG. 1. These texture predictors are generated as follows in the case where the temporal frequency of the low resolution sequence is equal to half the temporal frequency of the high resolution sequence (for example, the low resolution sequence is a progressive sequence in CIF format, i.e. measuring 352 by 288 pixels, 30 Hz and the high resolution sequence is an interlaced sequence in SD format, i.e. 720 by 576 pixels, 60 Hz):

A frame texture predictor measuring W by 2H is generated 30 from the texture data of the low resolution picture of index k by applying the texture prediction ESS method with an inter-layer ratio equal to $$\frac{W}{w}$$

in the horizontal direction of the picture and $$\frac{2H}{2h}$$

in the vertical direction of the picture; and

A texture predictor measuring W by H is generated 31 for the top field of the high resolution picture by vertically subsampling the frame texture predictor generated in the preceding step, i.e. by retaining its even lines.

In this particular case, no texture predictor is generated for the bottom fields. If the bottom fields are encoded before the top fields ("bottom field first" mode), then no texture predictor is generated for the top fields and the texture predictor measuring W by H is generated for the bottom field of the high resolution picture by vertically subsampling the frame texture predictor, i.e. by retaining its odd lines.

The right-hand part of FIG. 3 illustrates the generation of texture predictors associated with the high resolution pictures of index k of FIG. 2 in the case where the temporal frequencies of the low and high resolution sequences are equal (for example, the low resolution sequence is a progressive sequence in 720p format, i.e. measuring 1280 by 720 pixels, 60 Hz and the high resolution sequence is an interlaced sequence in 1080i format, i.e. 1920 by 540 pixels, 60 Hz):

A first intermediate frame texture predictor 32 measuring W by 2H is generated from the texture data of the low resolution picture of index 2k by applying the ESS method with an inter-layer ratio equal to $$\frac{W}{w}$$

in the horizontal direction of the picture and $$\frac{2H}{2h}$$

in the vertical direction of the picture;

A texture predictor measuring W by H is generated 34 for the top field of the high resolution picture by vertically subsampling the first intermediate frame texture predictor generated in the preceding step, i.e. by retaining its even lines;

A second intermediate frame texture predictor measuring W by 2H is generated 33 from the texture data of the low resolution picture of index 2k+1 by applying the ESS method with an inter-layer ratio equal to $$\frac{W}{w}$$

in the horizontal direction of the picture and $$\frac{2H}{2h}$$

in the vertical direction of the picture;

A texture predictor measuring W by H is generated 35 for the bottom field of the high resolution picture by vertically subsampling the second intermediate frame texture predictor generated in the preceding step, i.e. by retaining its odd lines; and A frame texture predictor measuring W by 2H is generated 36 by interlacing the texture predictors respectively associated with the bottom field and the top field.

However, for the last picture of the current GOP, the frame texture predictor measuring W by 2H is generated from the texture predictor associated with the top field of the high resolution picture by applying the ESS method with an inter-layer ratio equal to 1 in the horizontal direction of the picture, and 2 in the vertical direction of the picture.

The last bottom field of the GOP, referenced 4B in FIG. 2, of the high resolution sequence has no predictor because the corresponding low resolution picture, referenced 9 in FIG. 2, belongs to the next GOP.

Figure 4:
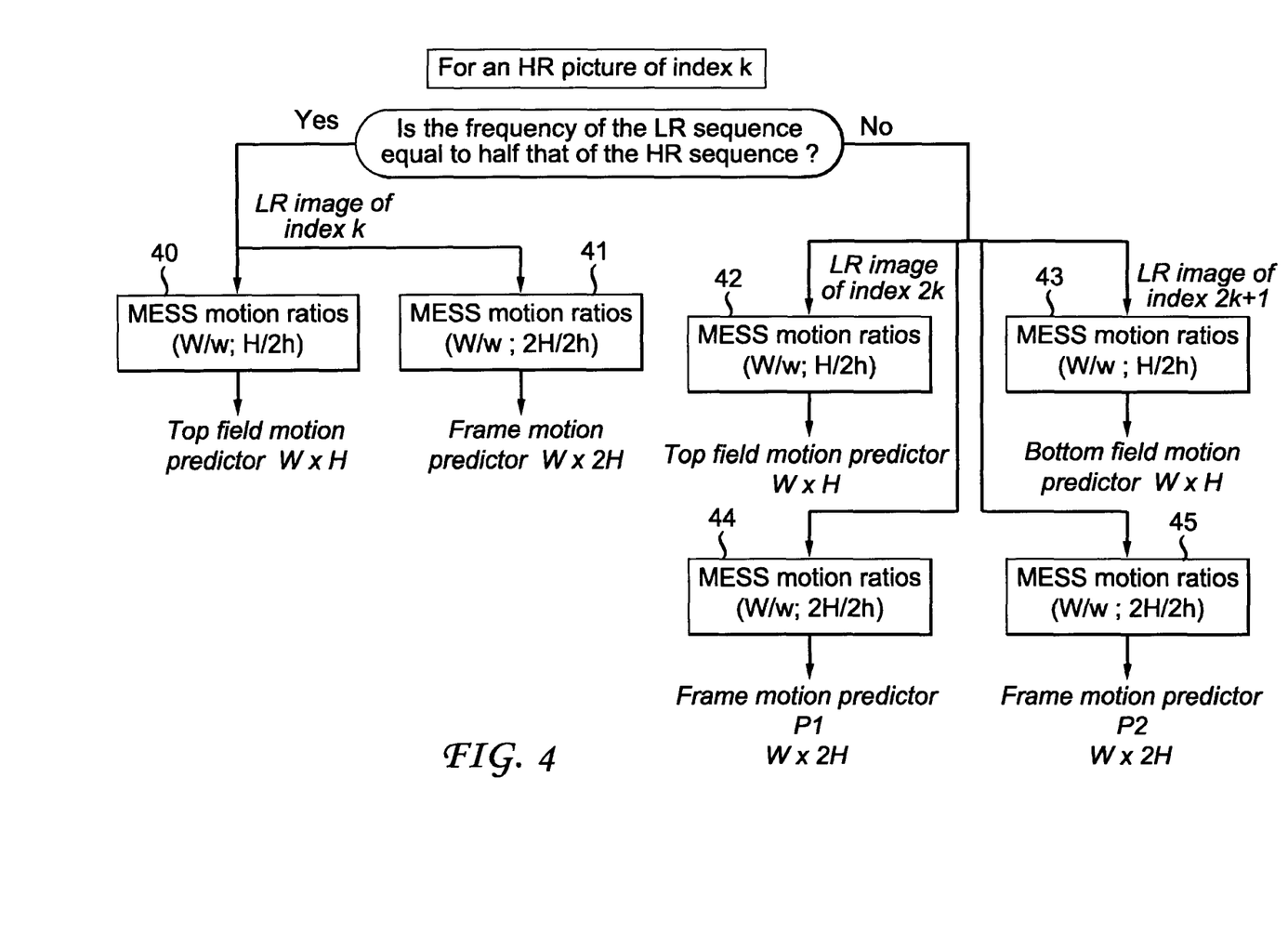
FIG. 4 illustrates the method of generating motion predictors according to the invention in the case where the sequence of low resolution pictures is progressive and the sequence of high resolution pictures is interlaced.

Motion predictors associated with the high resolution pictures of index k in FIG. 1 are generated in the following manner as illustrated by FIG. 4 in the case where the temporal frequency of the low resolution sequence is equal to half the temporal frequency of the high resolution sequence:

A motion predictor measuring W by H is generated 40 for the top field of the high resolution picture from the motion data of the low resolution picture of index k by applying the modified ESS method described above with an inter-layer ratio equal to $$\frac{W}{w}$$

in the horizontal direction or the picture and $$\frac{H}{2h}$$

in the vertical direction of the picture; and

A frame motion predictor measuring W by 2H is generated 41 from the motion data of the low resolution picture of index k by applying the modified ESS method described above with an inter-layer ratio equal to $$\frac{W}{w}$$

in the horizontal direction of the picture and $$\frac{2H}{2h}$$

in the vertical direction of the picture.

In this particular case, no motion predictor is generated for the bottom fields. If the bottom fields are encoded before the top fields ("bottom field first" mode), then no motion predictor is generated for the top fields and the motion predictor measuring W by H is generated for a bottom field by vertically subsampling the frame motion predictor, i.e. by retaining its odd lines.

In the other cases, i.e. when the temporal frequencies of the low and high resolution sequences are equal, the motion predictors of the high resolution picture of index k in FIG. 2 are generated in the following manner as illustrated by FIG. 4:

A motion predictor measuring W by H is generated 42 for the top field of the high resolution picture from the motion data of the low resolution picture of index 2k by applying the modified ESS method described above with an inter-layer ratio equal to $$\frac{W}{w}$$

in the horizontal direction of the picture and $$\frac{H}{2h}$$

in the vertical direction of the picture; the duly generated reference picture indices are divided by 2;

A motion predictor measuring W by H is generated 43 for the bottom field of the high resolution picture from the motion data of the low resolution picture of index 2k+1 by applying the modified ESS method described above with an inter-layer ratio equal to $$\frac{W}{w}$$

in the horizontal direction of the picture and $$\frac{H}{2h}$$

in the vertical direction of the picture; the duly generated reference picture indices are divided by 2; and A frame motion predictor measuring W by 2H is generated from the motion data of the low resolution picture of index 2k or 2k+1 by applying the modified ESS method with an inter-layer ratio equal to $$\frac{W}{w}$$

in the horizontal direction of the picture and $$\frac{2H}{2h}$$

in the vertical direction of the picture.

According to a variant, two frame motion predictors, referenced P1 and P2 in FIG. 4, measuring W by 2H are generated (references 44 and 45), one, P1, from the low resolution picture of index 2*k* and the other, P2, from the picture of index 2*k*+1 by applying the modified ESS method with an inter-layer ratio equal to $$\frac{W}{w}$$

in the horizontal direction of the picture and $$\frac{2H}{2h}$$

in the vertical direction of the picture.

According to a variant, no texture and motion predictor is generated for the last picture of each GOP of the sequence. In practice, to generate the motion and texture predictors for this picture, it is necessary to decode and store the corresponding GOP of the low resolution sequence and the next GOP as is illustrated by FIGS. 1 and 2.

If the method is used by a coding method, all motion predictors (respectively texture predictors) may be generated in order to select the most appropriate one according to a given criteria, e.g. a rate distortion criteria. If said method is used by a decoding method, then a single motion predictor (respectively a single texture predictor) is generated, the type of predictor is specified in the bitstream.

Of course, the invention is not limited to the above-mentioned exemplary embodiments. In particular, those skilled in the art can apply any variant to the embodiments described and combine them to benefit from their different advantages. For example, the method according to the invention can be applied to a part of the high resolution picture. In practice, it is possible to generate motion and/or texture predictors for blocks of pixels (for example, macroblocks measuring 16 by 16 pixels) of the high resolution picture from motion and/or texture data associated with blocks of pixels of the low resolution pictures. Similarly, the invention has been described in the case where the top field of an interlaced picture is displayed first ("top field first" case) and can be extended directly to the case where the bottom field is displayed first ("bottom field first" case) by reversing the top and bottom fields. Moreover, the invention can also be extended to the case of several high resolution sequences (i.e. several enhancement layers). Furthermore, the invention is advantageously used by a method of encoding or decoding a sequence of pictures or video. Preferably, the sequence of low resolution pictures is encoded according to the MPEG4 AVC encoding standard defined in document ISO/IEC 14496-10 ("Information technology—Coding of audio-visual objects—Part 10: Advanced Video Coding").

The invention claimed is:

1. Method as part of a scalable encoding or decoding method, for generating for at least one block of pixels of a picture of a high resolution sequence of high resolution interlaced pictures at least one motion predictor from motion data associated with the pictures of a low resolution sequence of low resolution progressive pictures each interlaced picture comprising a top field interlaced with a bottom field, a temporal reference being associated with each progressive picture and each field of an interlaced picture, wherein the method comprises:

generating at least one frame motion predictor from motion data associated with at least one block of pixels of the low resolution picture with the same temporal reference as the top or bottom field of said high resolution picture; and generating at least one field motion predictor from motion data associated with at least one block of pixels of the low resolution picture with the same temporal reference as the top field or bottom field of said high resolution picture.

2. Method according to claim 1, wherein generating said at least one frame motion predictor comprises subsampling said motion data associated with said at least one block of pixels of the low resolution picture with the same temporal reference as the top or bottom field of said high resolution picture with a horizontal inter-layer ratio in the horizontal direction of the picture and a vertical inter-layer ratio in the vertical direction of the picture, said horizontal inter-layer ratio being equal to the width of the high resolution picture divided by the width of the low resolution pictures and said vertical inter-layer ratio being equal to the height of the high resolution pictures divided by the height of the low resolution pictures.

3. Method according to claim 1, wherein the method further comprises:

when the temporal frequency of the high resolution sequence is equal to the temporal frequency of the low resolution sequence, generating at least one texture predictor for said at least one block of pixels from at least one of:

texture data associated with said at least one block of pixels of the low resolution picture with the same temporal reference as the top field of said high resolution picture; and texture data associated with said at least one block of pixels of the low resolution picture with the same temporal reference as the bottom field of said high resolution picture; and texture data associated with each of said at least one block of pixels of the low resolution pictures with the same temporal reference as one of the bottom or top fields of said high resolution picture; and when the temporal frequency of the high resolution sequence is equal to twice the temporal frequency of the low resolution sequence, generating at least one texture predictor for said at least one block of pixels from texture data associated with said at least one block of pixels of the low resolution picture with the same temporal reference as the top field of said high resolution picture.

4. Method according to claim 1, wherein the motion data associated with the low resolution pictures comprises motion vectors.

5. Method according to claim 4, wherein said method is used by a method of encoding high resolution pictures from low resolution pictures encoded according to the MPEG-4 AVC standard.

6. Method according to claim 1, wherein, when the temporal frequency of said high resolution sequence is equal to the temporal frequency of said low resolution sequence, the method comprises:

generating one top field motion predictor by subsampling said motion data associated with at least one block of pixels of the low resolution picture with the same temporal reference as the top field of said high resolution picture with a horizontal inter-layer ratio in the horizontal direction of the picture and a vertical inter-layer ratio in the vertical direction of the picture; and generating one bottom field motion predictor by subsampling said motion data associated with at least one block of pixels of the low resolution picture with the same temporal reference as the bottom field of said high resolution picture with said horizontal inter-layer ratio in the horizontal direction of the picture and said vertical inter-layer ratio in the vertical direction of the picture, said horizontal inter-layer ratio being equal to the width of the high resolution picture divided by the width of the low resolution pictures and said vertical inter-layer ratio being equal to the height of the fields of the high resolution pictures divided by the height of the low resolution pictures.

7. Method according to claim 1, wherein, when the temporal frequency of the high resolution sequence is equal to twice the temporal frequency of said low resolution sequence, the method comprises generating either one top field motion predictor or one bottom field motion predictor by subsampling motion data associated with at least one block of pixels of the low resolution picture with the same temporal reference as the top field respectively as the bottom field of said high resolution picture with a horizontal inter-layer ratio in the horizontal direction of the picture and a vertical inter-layer ratio in the vertical direction of the picture, said horizontal inter-layer ratio being equal to the width of the high resolution picture divided by the width of the low resolution pictures and said vertical inter-layer ratio being equal to the height of the fields of the high resolution picture divided by the height of the low resolution pictures.

* * * * *